US011252232B2

(12) United States Patent
Patel et al.

(10) Patent No.: US 11,252,232 B2
(45) Date of Patent: Feb. 15, 2022

(54) NVME-OF QUEUE MANAGEMENT IN HOST CLUSTERS

(71) Applicant: International Business Machines Corporation, Armonk, NY (US)

(72) Inventors: Kushal Patel, Pune (IN); Sarvesh S. Patel, Pune (IN); Subhojit Roy, Pune (IN)

(73) Assignee: International Business Machines Corporation, Armonk, NY (US)

( * ) Notice: Subject to any disclaimer, the term of this patent is extended or adjusted under 35 U.S.C. 154(b) by 92 days.

(21) Appl. No.: 16/796,991

(22) Filed: Feb. 21, 2020

(65) Prior Publication Data

US 2021/0266361 A1    Aug. 26, 2021

(51) Int. Cl.
*H04L 29/08*    (2006.01)
*G06F 9/455*    (2018.01)
*G06F 13/42*    (2006.01)

(52) U.S. Cl.
CPC ...... *H04L 67/1097* (2013.01); *G06F 9/45558* (2013.01); *G06F 13/4226* (2013.01); *G06F 2009/4557* (2013.01); *G06F 2009/45579* (2013.01); *G06F 2213/0026* (2013.01)

(58) Field of Classification Search
CPC ............. H04L 67/1097; G06F 9/45558; G06F 13/4226; G06F 2009/4557; G06F 2009/45579; G06F 2213/0026
See application file for complete search history.

(56) References Cited

U.S. PATENT DOCUMENTS

| 10,466,933 | B1* | 11/2019 | Bysani Venkata Naga ................. G06F 3/0622 |
| 2010/0250786 | A1* | 9/2010 | Corry .................... G06F 3/0605 710/8 |
| 2011/0178790 | A1* | 7/2011 | Golbourn .............. G06F 9/5011 703/22 |
| 2013/0247154 | A1* | 9/2013 | Varadharajan .......... H04L 63/08 726/4 |
| 2016/0127468 | A1* | 5/2016 | Malwankar ......... G06F 9/45558 709/212 |
| 2017/0083252 | A1 | 3/2017 | Singh et al. |
| 2018/0089101 | A1* | 3/2018 | Sternberg ............ G06F 9/45533 |

(Continued)

OTHER PUBLICATIONS

Mell et al., "The NIST Definition of Cloud Computing", Recommendations of the National Institute of Standards and Technology, Sep. 2011, U.S. Department of Commerce, 7 pages.

*Primary Examiner* — Eric T Oberly
(74) *Attorney, Agent, or Firm* — Daniel M. Yeates

(57) ABSTRACT

A computer-implemented method manages I/O queues in a host clustered system. The method includes, receiving, from a first virtual machine (VM), a request to establish a set of I/O queues in a storage system, and the first VM is supported by a first host. The method further includes, mapping a data volume to a target storage system, wherein the data volume is related to the request. The method includes, sending a first connection request from the first host to the target storage system. The method further includes, establishing, in response to the first connection request, a connection between the first host and the target storage system. The method incudes, blocking a second connection request, wherein the second connection request is directed to a second storage system, the second storage system being included in the storage system.

20 Claims, 6 Drawing Sheets

(56) References Cited

U.S. PATENT DOCUMENTS

| | | | |
|---|---|---|---|
| 2018/0307521 A1* | 10/2018 | Pinto | .................... G06F 9/45558 |
| 2018/0321945 A1 | 11/2018 | Benisty | |
| 2019/0042151 A1 | 2/2019 | Yang et al. | |
| 2019/0294373 A1 | 9/2019 | Lee et al. | |
| 2020/0036811 A1* | 1/2020 | Dar | ......................... H04L 67/10 |

* cited by examiner

NVME-OF QUEUE MANAGEMENT IN HOST CLUSTERS

BACKGROUND

The present disclosure relates to storage systems, and, more specifically, to improving queue management in host clusters.

Solid state memory systems (e.g., flash, SSD, etc.) have many benefits over traditional hard disk drives (HDD). Solid state is faster and has no moving parts that can fail. However, many interface standards were developed to operate with the moving parts of a traditional HDD (e.g., SATA, SAS, etc.). There are new protocols that are designed for faster data transfer between servers, storage devices, flash controllers, and other similar components. These new systems can provide a register interface and command set that enables high performance storing and retrieving of data in a storage medium.

SUMMARY

Disclosed is a computer-implemented method to manage I/O queues in a host clustered system. The method includes, receiving, from a first virtual machine (VM), a request to establish a set of I/O queues in a storage system, wherein the first VM is included in a host cluster, and the first VM is supported by a first host. The method further includes, mapping a data volume to a target storage system, wherein the target storage system is included in the storage system, and the data volume is related to the request. The method includes, sending a first connection request from the first host to the target storage system. The method further includes, establishing, in response to the first connection request, a connection between the first host and the target storage system. The method incudes, blocking a second connection request, wherein the second connection request is directed to a second storage system, the second storage system being included in the storage system. Further aspects of the present disclosure are directed to systems and computer program products containing functionality consistent with the method described above.

The present Summary is not intended to illustrate each aspect of, every implementation of, and/or every embodiment of the present disclosure.

BRIEF DESCRIPTION OF THE DRAWINGS

Various embodiments are described herein with reference to different subject-matter. In particular, some embodiments may be described with reference to methods, whereas other embodiments may be described with reference to apparatuses and systems. However, a person skilled in the art will gather from the above and the following description that, unless otherwise notified, in addition to any combination of features belonging to one type of subject-matter, also any combination between features relating to different subject-matter, in particular, between features of the methods, and features of the apparatuses and systems, are considered as to be disclosed within this document.

The aspects defined above, and further aspects disclosed herein, are apparent from the examples of one or more embodiments to be described hereinafter and are explained with reference to the examples of the one or more embodiments, but to which the invention is not limited. Various embodiments are described, by way of example only, and with reference to the following drawings.

DETAILED DESCRIPTION

Figure 1:
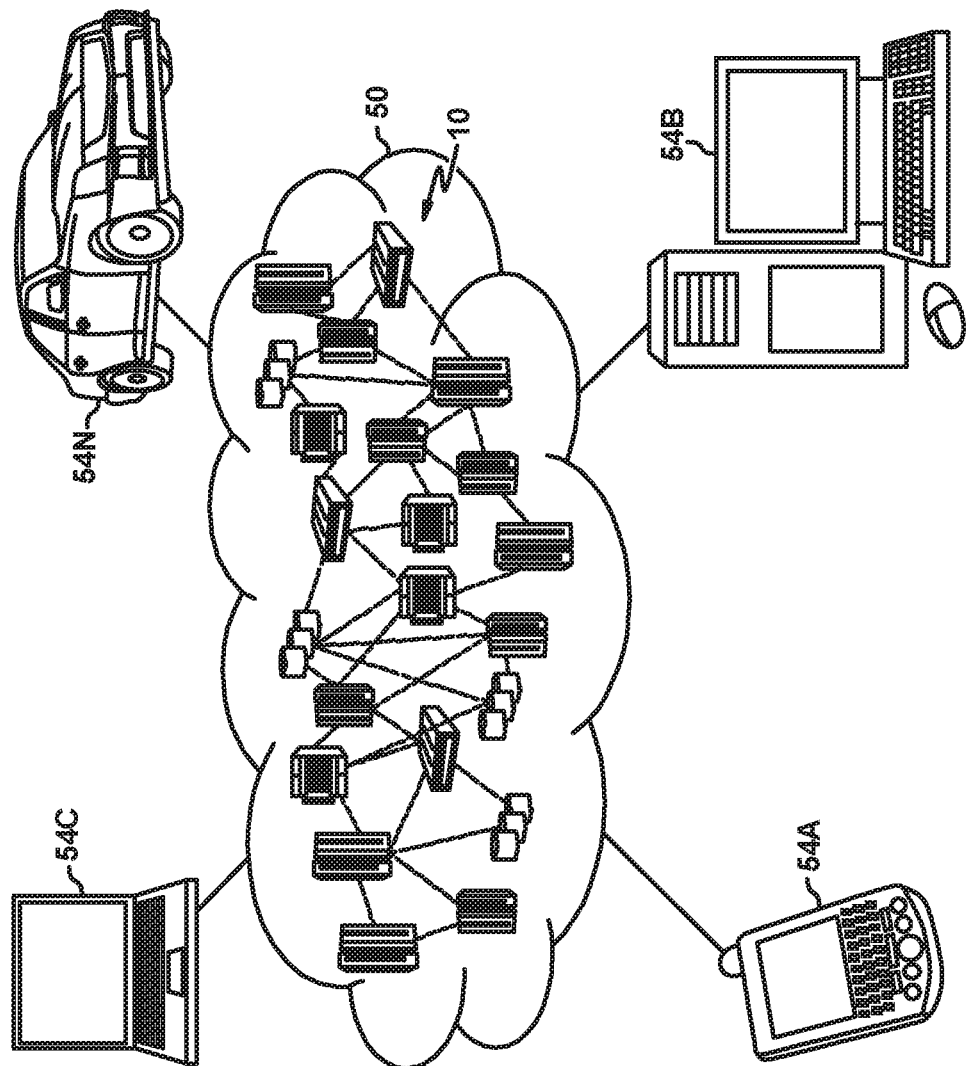
FIG. 1 depicts a cloud computing environment according to an embodiment of the present invention.

Many modern computing systems use virtual machines (VM). A VM is an emulation of a computer system that provide the functionality of a computer without requiring separate hardware. A single host can run multiple VMs at the same time through VM management software. Generally, when deployed in a multi-storage setting, each host maintains a connection with each storage system. This can unnecessarily consume computing resources while providing no benefit.

In order to better utilize computing resources in clustered host systems, embodiments of the present disclosure may identify when a VM host establishes unnecessary I/O queues at one site of a multi-site storage systems. Embodiments of the present disclosure also terminate the connection and deallocate computing resources from the unnecessary I/O queues, thereby saving computing resources and increasing the overall efficiency of the system. Embodiments of the present disclosure re-establish connections when a VM is transferred to a host without an established connection to the necessary storage site.

The following acronyms may be used below:
API application program interface
ARM advanced RISC machine
CD-ROM compact disc ROM
CMS content management system
CoD capacity on demand
CPU central processing unit
CUoD capacity upgrade on demand
DPS data processing system
DVD digital versatile disk
EPROM erasable programmable read-only memory
FPGA field-programmable gate arrays
HA high availability
IaaS infrastructure as a service
I/O input/output
IPL initial program load
ISP Internet service provider
ISA instruction-set-architecture
LAN local-area network
LPAR logical partition
PaaS platform as a service
PDA personal digital assistant
PLA programmable logic arrays
RAM random access memory
RISC reduced instruction set computer
ROM read-only memory
SaaS software as a service
SLA service level agreement SRAM static random-access memory
WAN wide-area network Cloud Computing in General It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as Follows

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
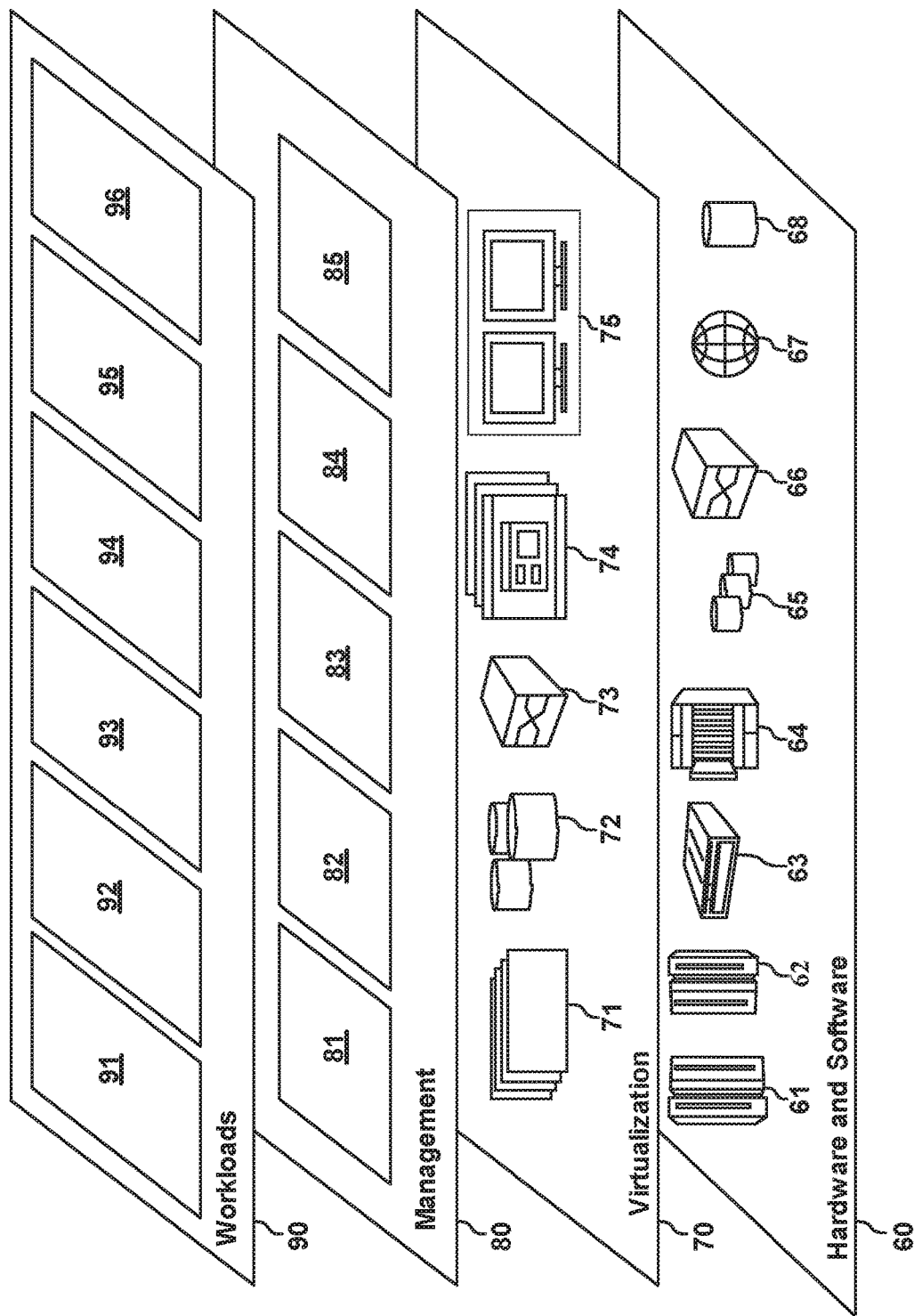
FIG. 2 depicts abstraction model layers according to an embodiment of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and mobile desktop 96.

Data Processing System in General

Figure 3:
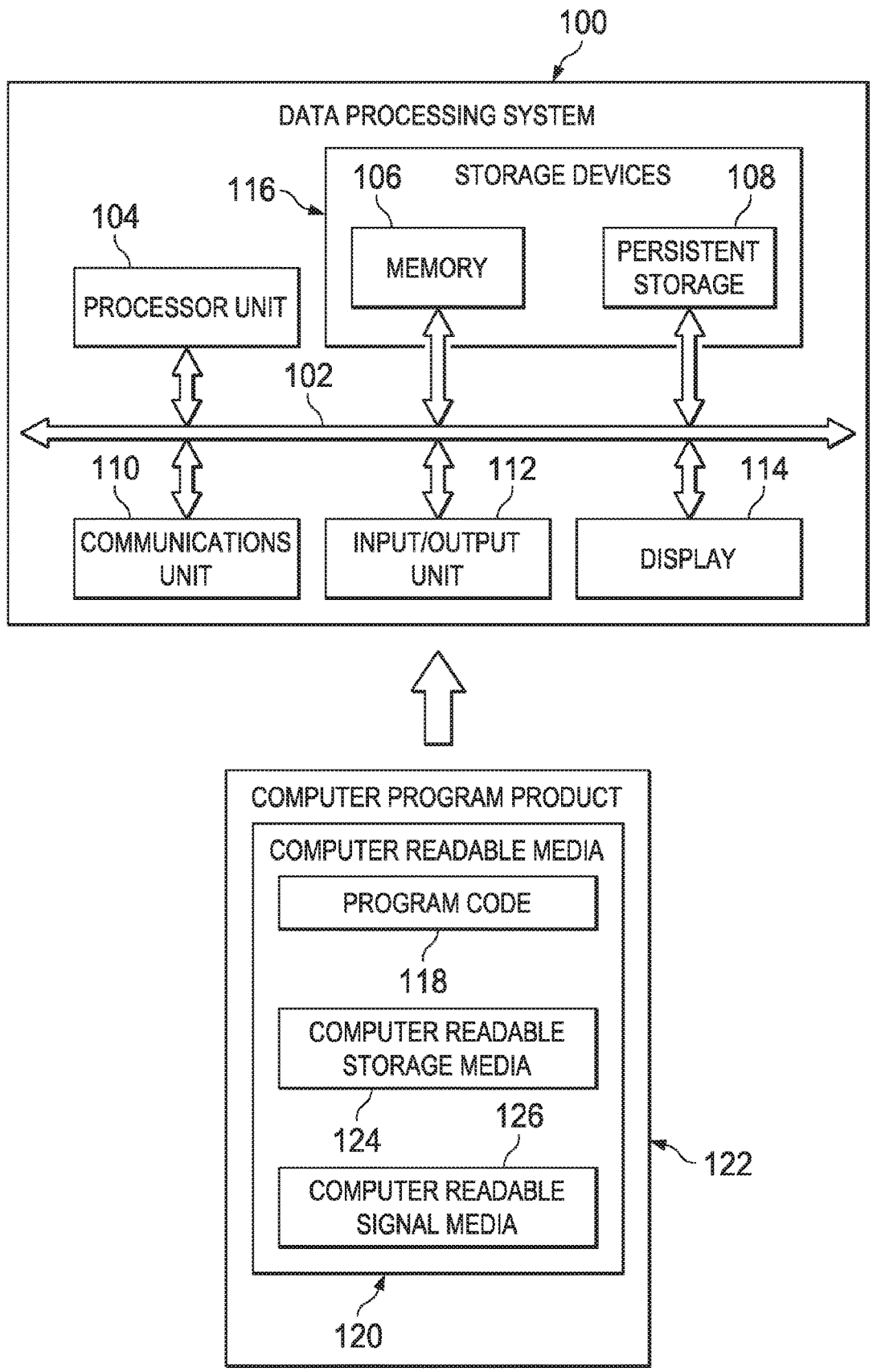
FIG. 3 is a block diagram of a DPS according to one or more embodiments disclosed herein.

FIG. 3 is a block diagram of an example DPS according to one or more embodiments. The DPS may be used as a cloud computing node 10. In this illustrative example, the DPS 100 may include communications bus 102, which may provide communications between a processor unit 104, a memory 106, persistent storage 108, a communications unit 110, an I/O unit 112, and a display 114.

The processor unit 104 serves to execute instructions for software that may be loaded into the memory 106. The processor unit 104 may be a number of processors, a multi-core processor, or some other type of processor, depending on the particular implementation. A number, as used herein with reference to an item, means one or more items. Further, the processor unit 104 may be implemented using a number of heterogeneous processor systems in which a main processor is present with secondary processors on a single chip. As another illustrative example, the processor unit 104 may be a symmetric multi-processor system containing multiple processors of the same type.

The memory 106 and persistent storage 108 are examples of storage devices 116. A storage device may be any piece of hardware that is capable of storing information, such as, for example without limitation, data, program code in functional form, and/or other suitable information either on a temporary basis and/or a permanent basis. The memory 106, in these examples, may be, for example, a random access memory or any other suitable volatile or non-volatile storage device. The persistent storage 108 may take various forms depending on the particular implementation.

For example, the persistent storage 108 may contain one or more components or devices. For example, the persistent storage 108 may be a hard drive, a flash memory, a rewritable optical disk, a rewritable magnetic tape, or some combination of the above. The media used by the persistent storage 108 also may be removable. For example, a removable hard drive may be used for the persistent storage 108.

The communications unit 110 in these examples may provide for communications with other DPSs or devices. In these examples, the communications unit 110 is a network interface card. The communications unit 110 may provide communications through the use of either or both physical and wireless communications links.

The input/output unit 112 may allow for input and output of data with other devices that may be connected to the DPS 100. For example, the input/output unit 112 may provide a connection for user input through a keyboard, a mouse, and/or some other suitable input device. Further, the input/output unit 112 may send output to a printer. The display 114 may provide a mechanism to display information to a user.

Instructions for the operating system, applications and/or programs may be located in the storage devices 116, which are in communication with the processor unit 104 through the communications bus 102. In these illustrative examples, the instructions are in a functional form on the persistent storage 108. These instructions may be loaded into the memory 106 for execution by the processor unit 104. The processes of the different embodiments may be performed by the processor unit 104 using computer implemented instructions, which may be located in a memory, such as the memory 106.

These instructions are referred to as program code, computer usable program code, or computer readable program code that may be read and executed by a processor in the processor unit 104. The program code in the different embodiments may be embodied on different physical or tangible computer readable media, such as the memory 106 or the persistent storage 108.

The program code 118 may be located in a functional form on the computer readable media 120 that is selectively removable and may be loaded onto or transferred to the DPS 100 for execution by the processor unit 104. The program code 118 and computer readable media 120 may form a computer program product 122 in these examples. In one example, the computer readable media 120 may be computer readable storage media 124 or computer readable signal media 126. Computer readable storage media 124 may include, for example, an optical or magnetic disk that is inserted or placed into a drive or other device that is part of the persistent storage 108 for transfer onto a storage device, such as a hard drive, that is part of the persistent storage 108. The computer readable storage media 124 also may take the form of a persistent storage, such as a hard drive, a thumb drive, or a flash memory, that is connected to the DPS 100. In some instances, the computer readable storage media 124 may not be removable from the DPS 100.

Alternatively, the program code 118 may be transferred to the DPS 100 using the computer readable signal media 126. The computer readable signal media 126 may be, for example, a propagated data signal containing the program code 118. For example, the computer readable signal media 126 may be an electromagnetic signal, an optical signal, and/or any other suitable type of signal. These signals may be transmitted over communications links, such as wireless communications links, optical fiber cable, coaxial cable, a wire, and/or any other suitable type of communications link.

In other words, the communications link and/or the connection may be physical or wireless in the illustrative examples.

In some illustrative embodiments, the program code 118 may be downloaded over a network to the persistent storage 108 from another device or DPS through the computer readable signal media 126 for use within the DPS 100. For instance, program code stored in a computer readable storage medium in a server DPS may be downloaded over a network from the server to the DPS 100. The DPS providing the program code 118 may be a server computer, a client computer, or some other device capable of storing and transmitting the program code 118.

The different components illustrated for the DPS 100 are not meant to provide architectural limitations to the manner in which different embodiments may be implemented. The different illustrative embodiments may be implemented in a DPS including components in addition to or in place of those illustrated for the DPS 100. Other components shown in FIG. 1

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

NVME Queue Manager in Host Clusters

Non-volatile Memory Express (NVMe) is a storage protocol that is designed for fast data transfer between servers, storage devices, and Flash Controllers that typically uses a peripheral component interconnect express (PCIe) bus. The specification of NVMe provides a register interface and a command set that enables high performance Input/Output (I/O). This is an alternative to the traditional Small Computer System Interface (SCSI) standards (and other standards like SAS, SATA, etc.) for data transmission across the hosts and storage systems. One of the major advantages of NVMe-based Peripheral Components Interconnect Express (PCIe) Flash over SAS and SATA-based SSDs is reduced latency of access in the host software stack, leading to higher inputs outputs per second (IOPS) and lower computing resource utilization.

NVMe supports parallel I/O processing with multicore servers that results in faster I/O dispensation that leads to reduction in I/O latency. Since there are multiple cores that are processing I/O requests simultaneously, system performance increases due to optimal utilization of CPU resources. Additionally, NVMe is designed in a way that it expects to use a lesser number of CPU instructions per I/O. NVMe also supports 64,000 commands in a single message queue and a maximum of 65,535 I/O queues.

NVMe over Fabrics (NVMe-oF) is an extension to local PCIe NVMe that allows the benefits of NVMe like high-performance and low-latency across network fabrics. Servers and storage devices can be connected over an Ethernet network or a fiber channel, and both of these interconnects support NVMe commands over the fabric that extends the advantages of NVMe protocol to interconnected system components.

NVMe-oF supports multiple I/O queues for regular I/O operation from host to storage systems. A maximum of ~65000 queues are supported by NVMe with ~64000 entries in each queue. The host driver generally creates the queues once a connection is established. Once the host is connected to the target system, a special purpose queue is created upon association (e.g., an Admin Queue). As the name suggests, the Admin Queue is used to transfers control commands from an initiator to the target device. Once the Admin Queue is created, it is used by the host to create I/O queues based on system requirements. The host may establish multiple I/O queues to a single controller with the same NVMe qualified name (NQN) and have multiple namespaces (or volumes) mapped to it. A volume can be a set of data (e.g., one or more extents, etc.) An NQN is a naming convention used to identify a connection between a host and a remote storage system. Once I/O queues are established, I/O commands are submitted to the I/O Submission Queue (SQ) and I/O responses are collected from the Completion Queue (CQ). These I/O queues can be added or removed using control instructions sent via the Admin Queue for that session.

When a command is received on the target device for I/O queue creation, the target device performs initial system checks for max supported queues and other relevant fields, creates an I/O queue and assigns this I/O queue to a CPU core on the storage controller. Once done, a response to the queue creation request is returned via the Admins Completion Queue. Each I/O Queue is assigned to specific CPU core by the storage controller. This allows parallelism and boosts throughput of the system. Core assignment logic is implemented at the target storage controller and I/O queue to core mapping is performed based on a predefined policy at the Storage Controller. At the time of queue creation, the NVMe driver creates the direct memory access (DMA) pool of Physical Region Pages for allocating the DMA-able memory space in the target and initiator devices. These pools are created for the I/O queues and memory from the pool is reserved for the I/O's coming to that Queue. A DMA pool is an allocation mechanism for small, coherent DMA mappings. Some systems allocate large amounts of DMA-able memory for the I/O Queues for performing I/O operations.

A host cluster is a group of logical host objects that can be managed together. In some systems, multiple hosts are couple together, and a host cluster is created. Each host can support more than VM at a time.

The host cluster is collectively managed together by host cluster software (or VM software) and can be used to serve advanced features like host-level high availability and disaster recovery mechanisms. Another major use case of host cluster is load balancing across the hosts for VMs deployed on the host cluster. The VM software provides capabilities for migration of a running VM from one host to other hosts without any downtime. This migration is transparent to the applications installed on the VM and load balancing can be achieved with transaction integrity at the VM level. The system uses internal protocols to manage access to the volumes and ensure consistency of the data. In some systems, the volumes for each VM are attached to all the hosts in the host cluster to provide uninterrupted storage access during and after the VM migration.

In these systems, each physical host running VM software needs to be connected to all the NVMe-oF subsystems present at the storage level. For example, consider two hosts combined to form a host cluster on which six VMs are installed. In this case, Host A and Host B both need to be connected to all subsystems in a NVMe-oF network (e.g., primary storage system and secondary storage). I/O queues are created on all the storage subsystems and keep consuming memory resources of a host even if the VMs on the host A are not at all accessing the secondary storage system.

Maintaining the I/O queues at the secondary storage system consumes valuable memory resources at the host and storage controller. Additionally, the storage subsystems may contain other volumes and I/O queues created by a different host. These volumes and system processes cannot get the benefit of the used memory resources allocated for I/O queues from Host A. Embodiments of the present disclosure seek to remedy the described inefficiencies, and thereby increase the overall efficiency of the systems.

Embodiments of the present disclosure monitor for new I/O queue creation requests. In response to receiving the request, VM software may identify existing connections between the host cluster and various storage systems. In some embodiments, the VM software determines which storage systems include volumes (e.g., maps VMs to volumes to storage systems) related to the request. The VM host, may then established connections between the host and the storage subsystems related to the request. In some embodiments, the VM software monitors and tracks I/O queue creation and processing. In some embodiments, VM software establishes a connection to the related subsystems in response a VM migrating to a different host. Thus, unnecessary connections are not established saving computing resources for other processes.

Embodiments of the present disclosure increase system efficiency at the storage systems and the hosts. The storage systems can allocate the memory from the unneeded connections to a different host and/or different processes. Additionally, these embodiments may reduce the bottleneck at the host. Rather than using memory to maintain unneeded cores, those computing resources may be allocated to different processes.

Embodiments of the present disclosure may be implemented within existing systems and deployed multi-site and/or in disaster recovery storage systems. No significant hardware and/or software changes are needed to gain some benefits of the current disclosure.

The aforementioned advantages are example advantages, and embodiments exist that can contain all, some, or none of the aforementioned advantages while remaining within the spirit and scope of the present disclosure.

Figure 4:
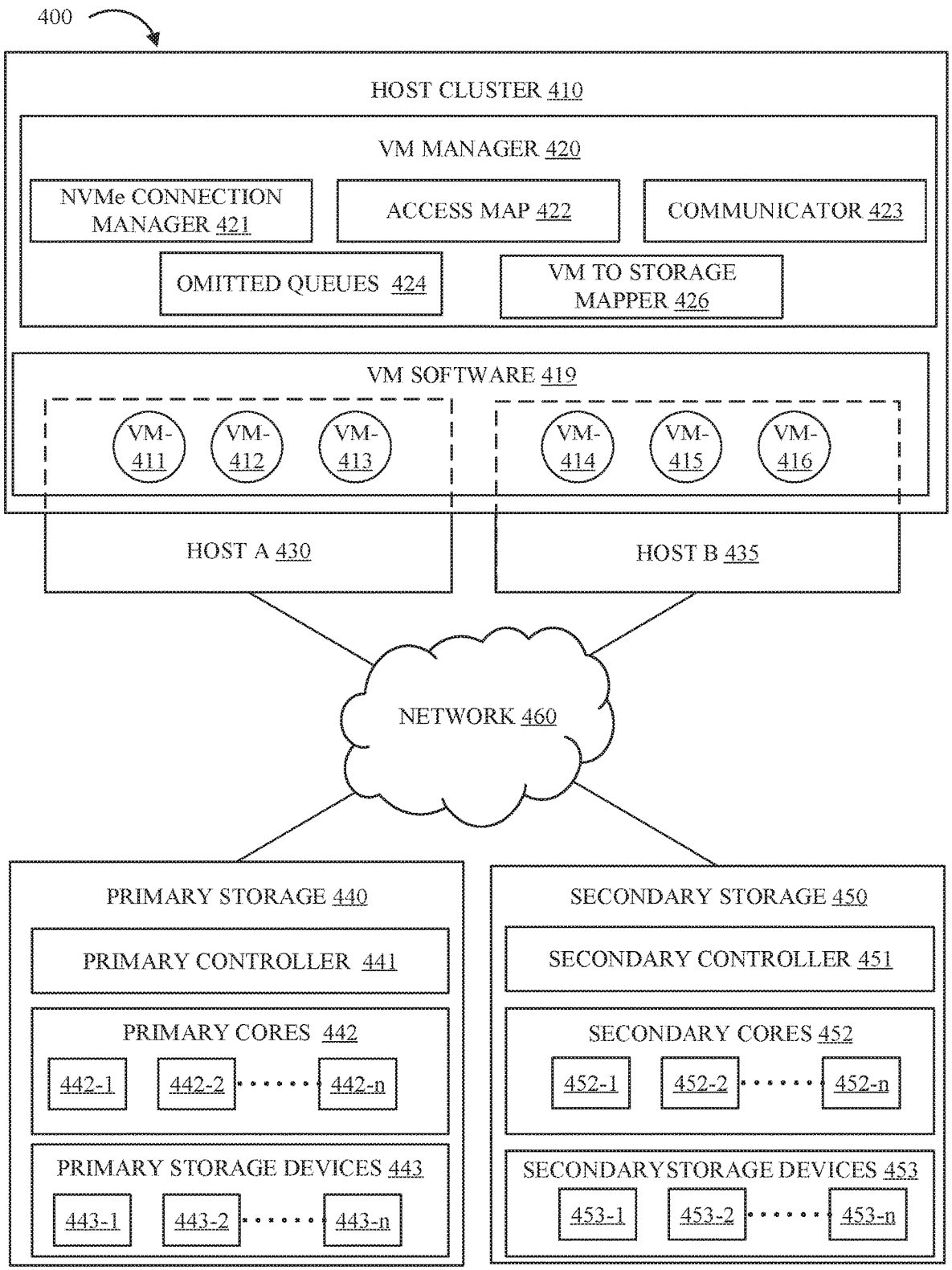
FIG. 4 illustrates a functional diagram of a computing environment suitable for operation of a VM manager, in accordance with some embodiments of the present disclosure.

Referring now to various embodiments of the disclosure in more detail, FIG. 4 is a representation of a computing environment 400, which may be, by way of example, the cloud computing environment 50, that is capable of running a VM manager in accordance with one or more embodiments of the present disclosure. Many modifications to the depicted environment may be made by those skilled in the art without departing from the scope of the disclosure.

Computing environment 400 includes host cluster 410, host A 430, host B 435, primary storage 440, secondary storage 450, and network 460.

Network 460 can be, for example, a telecommunications network, a local area network (LAN), a wide area network (WAN), such as the Internet, or a combination of the three, and can include wired, wireless, or fiber optic connections. Network 460 may include one or more wired and/or wireless networks that are capable of receiving and transmitting data, voice, and/or video signals, including multimedia signals that include voice, data, and video information. In general, network 460 may be any combination of connections and protocols that will support communications between includes host cluster 410, host A 430, host B 435, primary storage 440, secondary storage 450, and other computing devices (not shown) within computing environment 400. In some embodiments, network 460 includes NVMe-oF connections and protocols. In some embodiments, computing environment 400 includes host cluster 410, host A 430, host B 435, primary storage 440, secondary storage 450, may include a computer system(s), such as the data processing system 100.

Host cluster 410 can be any combination of hardware and/or software configured to operate one or more VMs. In some embodiments, host cluster 410 shares resources of the one or more hosts (e.g., host A 430, host B 435) supporting the cluster. In some embodiments, host cluster 410 includes VM-411, VM-412, VM-413, VM-414, VM-415, VM-416, VM software 419, and VM manager 420.

VM-411 can be any combination of hardware and/or software to emulate a physical computing device. In some embodiments, VM-411 is supported by a host (e.g., host A 430). Load management and host resources may be VM manager 420 and/or VM software 419. In some embodiments, VM-411 can be migrated to a different host. In some embodiments, VM-411 is designated to operate an application/process. The resources to run the application are drawn from host cluster 410, and more specifically, from one host (e.g., host A 430). In FIG. 4, the dotted box connected to host A 430 represents host A 430 is hosting VM-411.

Each of VM-412 through VM-416 can be any combination of hardware and/or software to emulate a physical computing device. In some embodiments, VM-412 through VM-416 can be consistent with VM-411, except each VM may be running a different application and/or a different process within an application.

VM software 419 can be any combination of hardware and software configured to create and manage VM's on various hosts. In some embodiments, VM software 419 can create and operate VMs. In some embodiments, VM software allocates host resources to one or more VM's. The VM software may migrate a specific VM to a different host. The migration may be based on load balancing, host failure, and/or other similar factors. In some embodiments, VM software 419 is included within VM manager 420, however they are shown separate for discussion purposes.

VM manager 420 can be any combination of hardware and/or software configured to manager VM I/Os. In some embodiments, VM manager 420 can generate/request connections from a host to a storage system based on the needs of a VM. VM manager 420 may also manage the creation of I/O queues between the host and the storage systems. In some embodiments, VM manager 420 includes NVMe connection manager 421, access map 422, communicator 423, omitted queues 424, VM migration connector 425, and VM to storage mapper 426.

NVMe connection manager 421 can be any combination of hardware and/or software configured to manage connections between hosts and storage systems. In some embodiments, NVMe connection manager 421 monitors and records each NVMe compatible connection between each host and storage system. NVMe connection manager 421 may also instruct a host to request and/or terminate a connection. Generally, the connections will be NQN connections. In some embodiments, NVMe connection manager 421 stores the connection data in access map 422.

In some embodiments, NVMe connection manager 421 manages the creation of I/O queues on the storage system. Each time an I/O queue is sent from a host to the target, it passes through the admin queue. The admin queue then assigns the I/O queue to a core based on instruction and logic in an NVMe storage controller (e.g., primary controller 441). After a core completes the processing of the command I/O queue, the result is placed in the admin queue and is subsequently forwarded to the host.

Access map 422 can be any combination of hardware and/or software configured to store data regarding host to storage system connections and I/O queues. In some embodiments, access map 422 is updated in response to each new/terminated connection/I/O queue. In some embodiments, access map 422 provides data to VM software relating to VM migrations.

In some embodiments, access map 422 includes a VM to volume map. This shows which VMs are accessing which volumes, which are further mapped to one or more storage systems.

Communicator 423 can be any combination of hardware and/or software configured to transfer data and/or instructions. In some embodiments, communicator 423 utilizes an asynchronous event request (AER). An AER is a request that is returned in response to an action being completed. For example, an AER may include a VM migration request. The signal will be returned in response to a migration commencing. In some embodiments, communicator 423 utilizes NQN to transfer data. This may occur in the normal processing of I/O queues. In some embodiments, communicator 423 utilizes an out of band API. The out of band API allows data to be sent outside of the NVMe protocol. The API may be able to bypass bottlenecks and/or other communication issued within the communications protocols.

Omitted queues 424 can be any combination of hardware and/or software configured to store omitted queue data. An omitted queue is an I/O queue that was not established or was terminated because the host had no VM's accessing any volumes mapped to a specific storage device. For example, generally, a host (host B 335) will establish a connection to all storage systems (e.g., primary storage 440 and secondary storage 450). If VM manager 420 determines host B 335 has no VM accessing secondary storage 450, then the associated I/O queues are not established and/or have been terminated. Those I/O queues are included in omitted queues 424. In some embodiments, omitted queues 424 provide data to establish a connection between a new host and the storage system in response to a storage system failure (e.g., primary storage 440 loses power).

In some embodiments, omitted queues 424 store queue data related to VM migrations. Continuing the above example, consider when a VM migration (e.g., from Host A 330 to host B 335) is triggered by VM software 419, (or one of the hosts in the host cluster experienced failure). The committed queue data may be stored from the previous connection request between the Host B 335 (e.g., new host), and secondary storage 450. The new I/O Queue Connect Request between Host B 335 and secondary storage 450 may be completed before the VM is migrated at the host cluster level. Once the connections are established, VM software 419 may receive an instruction (e.g. an AER) to begin the VM migration (or to start VM building if host A failed).

VM to storage mapper 426 can be any combination of hardware and/or software configured to identify volume locations based on an I/O request. In some embodiments, VM to storage mapper 426 identifies which storage subsystems contain the volumes required to complete an I/O request. The mapped data paths may be stored in access map 422.

Host A 430 can be a standalone computing device, a management server, a web server, a mobile computing device, or any other electronic device or computing system capable of receiving, sending, and processing data. In some embodiments, host A 430 can represent a server computing system utilizing multiple computers as a server system, such as in a cloud computing environment 400. In some embodiments, host A 430 represents a computing system utilizing clustered computers and components (e.g., database server computers, application server computers, etc.) that act as a single pool of seamless resources when accessed within computing environment 400. FIG. 4 depicts host A 430 supporting three VM, however, in various embodiments, host A 430 can support a greater or fewer number of VMs. In some embodiments, the cloud computing environment 400 includes VM software 419.

Host B 435 can be a standalone computing device, a management server, a web server, a mobile computing device, or any other electronic device or computing system capable of receiving, sending, and processing data. In some embodiments Host B 435 can be consistent with Host A 430.

Primary storage 440 can be a standalone computing device, a management server, a web server, a mobile computing device, or any other electronic device or computing system such as data processing system 100, capable of receiving, sending, and processing data. In other embodiments, primary storage 440 can represent a server computing system utilizing multiple computers as a server system, such as in a cloud computing environment 50, 400. In some embodiments, primary storage 440 represents a computing system utilizing clustered computers and components (e.g., database server computers, application server computers, etc.) that act as a single pool of seamless resources when accessed within cloud computing environment 400. In some embodiments, primary storage 440 is a NVMe storage system. In some embodiments, primary storage 440 uses peripheral component interconnect express (PCLe) as a physical component to transfer data to and from the storage medium. PCLe is a high-speed connection and bus. PCLe can have a higher throughput with a lower pin count than some other standard connection types (e.g., PCI, AGP, etc.). In some embodiments, primary storage 440 includes primary controller 441, primary cores 442, and primary storage devices 443.

Primary controller 441 can be any combination of hardware and/or software configured to facilitate the I/O queue transfer from an initiating device (e.g., host A 430) and primary storage 440. In some embodiments, primary controller 441 generates and assigns I/O queues to various cores. The queues may be generated and assigned based on the requirements of the capabilities and need of the initiating device and/or the capabilities and need of the target storage system(s). In some embodiments, host controller allocates memory for the processing of the queues on the initiator (e.g., host) and/or target devices.

Primary cores 442 can be any combination of hardware and/or software configured to process data. In some embodiments, primary cores 442 includes primary cores 442-1, 442-2, through 442-*n*. Primary cores 442 may refer to 442-1 through 442-*n* collectively or representatively. In various embodiments, primary cores 442 may include any number of cores. In some embodiments, each core of primary cores 442 may be assigned to process one or more I/O queues. Primary cores 442 may perform read/write operations for primary storage devices 443.

Primary storage devices 443 can be any combination of hardware and/or software configured for the long-term storage of data. In some embodiments, primary storage devices 443 includes primary storage devices 443-1, 443-2, through 443-*n*. Primary storage devices 443 may refer to 443-1 through 443-*n* collectively or representatively. In various embodiments, primary storage devices 443 may include any number of devices (e.g., n can be any number). Each device of storage device 443 may be the same type of device, may be different types, or may be any combination of devices. The storage devices may include any type of storage medium (e.g., tape drives, hard disk drives (HDD), solid state drives (SSD), flash, etc.)

Secondary storage 450 can be a standalone computing device, a management server, a web server, a mobile computing device, or any other electronic device or computing system, such as data processing system 100, capable of receiving, sending, and processing data. In other embodiments, secondary storage 450 can represent a server computing system utilizing multiple computers as a server system, such as in a cloud computing environment 50, 400. In some embodiments, secondary storage 450 represents a computing system utilizing clustered computers and components (e.g., database server computers, application server computers, etc.) that act as a single pool of seamless resources when accessed within computing environment 400. In some embodiments, secondary storage 450 is an NVMe storage system. In some embodiments, primary storage 440 uses peripheral component interconnect express (PCLe) as a physical component to transfer data to and from the storage medium. PCLe is a high-speed connection and bus. PCLe can have a higher throughput with a lower pin count than some other standard connection types (e.g., PCI, AGP, etc.). In some embodiments, secondary storage 450 includes secondary controller 451, secondary cores 452, and secondary storages devices 453. In some embodiments, secondary storage 450 is consistent with primary storage 440.

Secondary controller 451 can be any combination of hardware and/or software configured to facilitate the I/O queue transfer from an initiating device (e.g., host A 430) and secondary storage 450. In some embodiments, secondary controller 451 is consistent with primary controller 441.

Secondary cores 452 can be any combination of hardware and/or software configured to process data. In some embodiments, secondary cores 452 includes secondary cores 452-1, 452-2, through 452-n. Secondary cores 452 may refer to 452-1 through 452-n collectively or representatively. In various embodiments, secondary cores 452 may include any number of cores. In some embodiments, secondary cores 452 may be consistent with primary cores 442.

Secondary storages devices 453 can be any combination of hardware and/or software configured for the long-term storage of data. In some embodiments, secondary storage devices 543 include secondary storage devices 453-1, 453-2, through 453-n. Secondary storage devices 453 may refer to 453-1 through 453-n collectively or representatively. However, in various embodiments, secondary storage devices 453 may include any number of devices. In some embodiments, backup storage devices may be consistent with primary storage devices 443.

In some embodiments, primary storage 440 and secondary storage 450 are in a single storage system. In some embodiments, primary storage 440 and/or secondary storage 450 may by subsystems of the storage system. The storage system may be a multi-site storage system.

Figure 5:
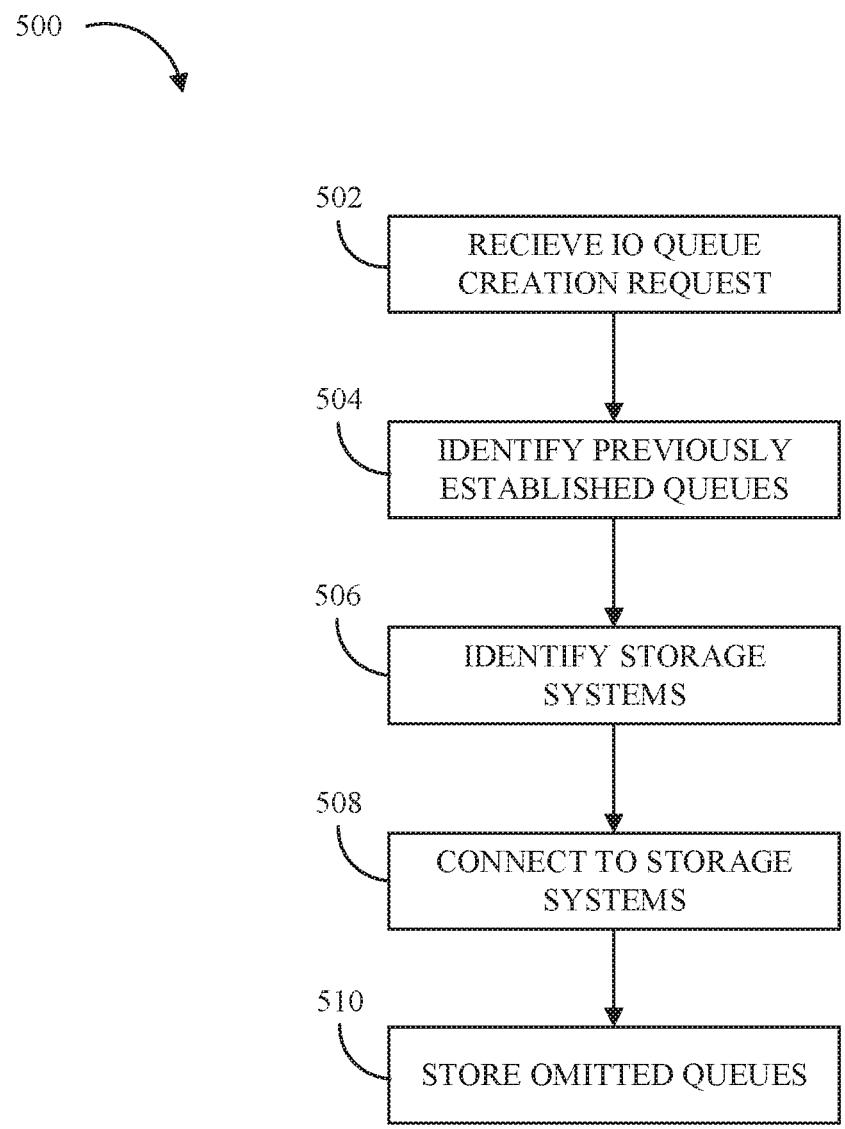
FIG. 5 illustrates a flow chart of an example method to establish only necessary I/O queues, in accordance with some embodiments of the present disclosure.
Figure 6:
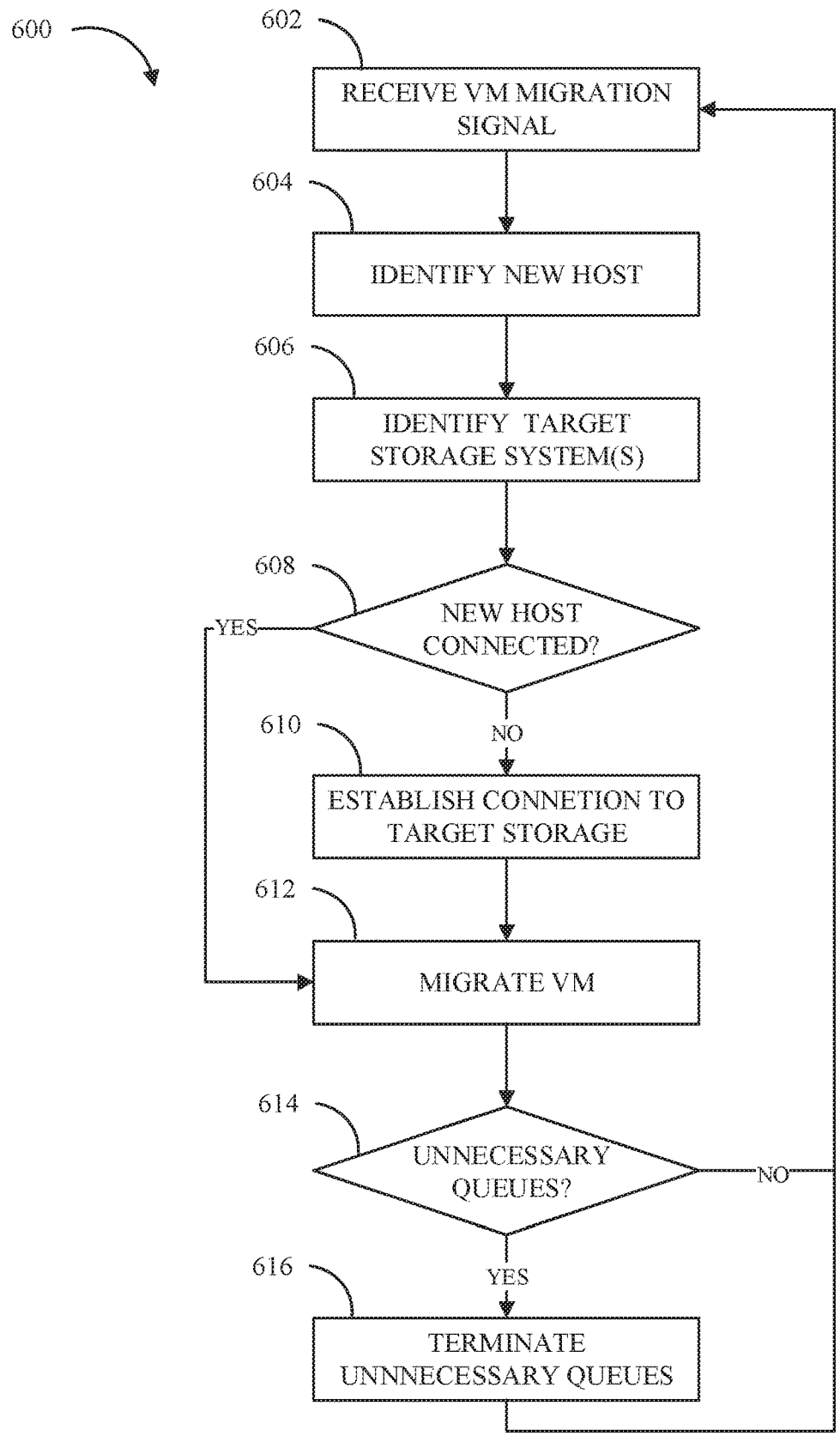
FIG. 6 illustrates a flow chart of an example method to maintain I/O queue continue during VM migration, in accordance with some embodiments of the present disclosure.

FIG. 5 and FIG. 6 depict a flowchart of example methods for managing I/O queues in a clustered host system that can be performed in a computing environment (e.g., computing environment 400). One or more of the advantages and improvements described above for identifying and correcting duplicate queues may be realized by methods 500, 600, consistent with various embodiments of the present disclosure.

Method 500 can be implemented by one or more processors, host cluster 410, VM manager 420, host a 430, host B 435, primary storage 440, secondary storage 450, their subcomponents and/or a different combination of hardware and/or software. Method 500 includes an example method of establishing necessary queues and/or not establishing unnecessary I/O queues on a storage system. In various embodiments, the various operations of method 500 are performed by one or more of host cluster 410, VM manager 420 host a 430, host B 435, primary storage 440, secondary storage 450, and the subcomponents of each of the foregoing. For illustrative purposes, the method 500 will be described as being performed by VM manager 420.

At operation 502, VM manager 420 receives an I/O queue creation request. In some embodiments, the request is generated by host cluster 410. In some embodiments, the request is generated by a VM (VM-411 will be used for this discussion). VM-411 will be supported by a host A 430 (it could be any host in computing environment 400). The request may be generated by an application operating on VM-411. The request may include I/O instructions related to one or more data volumes.

At operation 504 VM manager 420 identifies previously established I/O queues. In some embodiments, operation 504 includes identifying each storage system to which the host is currently connected. The connection may be an NQN, or any other connection that supports NMVe data transfer. In some embodiments, established I/O queue data is obtained from access map 422. Access map 422 may be parsed to determine which VMs being supported by host A 430 are mapped to which storage devices.

At operation 506, VM manager 420 identifies storage systems needed to complete the request. In some embodiments, the storage systems are identified by the data (or data volumes) in the request. In some embodiments, operation 506 includes generating a transitive map for VM-411. The map may be generated by VM to storage mapper 426. It may identify volumes and where the volumes are stored or will be stored. Each volume is linked to one or more storage systems. Each storage system that includes identifies volumes may be needed to complete the request.

At operation 508, VM manager 420 establishes a connection to the needed storage system. In some embodiments, the connection is an NQN. The connection may be requested in response to being identified as the needed storage system in operation 506. In some embodiments, establishing the connection includes establishing I/O queues between host a 330 and the storage system. In some embodiments, operation 508 includes not connecting to unneeded storage systems. For example, if primary storage 540 is identified as needed and secondary storage 550 is not, then only a connection to primary storage 540 will be established. VM manager 420 may block the connection request sent to secondary storage 450. In some embodiments, VM manager 421 and/or communicator 423 send a message to secondary storage 450 to deny any connection request. The message may be sent by standard communication methods (e.g., NQN) and/or via an out of band API.

At operation 510, VM manager 420 stores the omitted queues. In some embodiments, the omitted queues are store in omitted queue 424. Data for each storage system that has a request connection blocked/not sent (any storage system not needed to complete the request) may be saved. The stored data may include I/O queue data, NQN, and other data that may be used to establish a connection. However, storing the data and not establishing the connection saves memory space at the unneeded storage systems. This may allow a different host/VM to utilize that memory to more efficiently perform other commands. The efficiency of the overall system is increased.

Method 600 can be implemented by one or more processors, host cluster 410, VM manager 420 host a 430, host B 435, primary storage 440, secondary storage 450, their subcomponents and/or a different combination of hardware and/or software. Method 600 includes an example method of maintaining only necessary connections during a VM migration. In various embodiments, the various operations of method 500 are performed by one or more of host cluster 410, VM manager 420, host a 430, host B 435, primary storage 440, secondary storage 450, and the subcomponents of each of the foregoing. For illustrative purposes, the method 500 will be described as being performed by VM manager 420.

At operation 602, VM manager 420 receives a migration signal. In some embodiments, the migration signal is generated by VM software 419. The signal may instruct one or more VM to migrate to a new host (e.g., from host A 330 to Host B 335). The migration may be needed for load balancing, because of a host failure, and/or other similar reasons. In some embodiments, operation 603 includes delaying/holding/pausing the VM migration. The delay allows for I/O queue establishment prior to migration. This may maintain continuity of I/O processing.

At operation 604, VM manager 420 identifies the new host. The new host is the host to which the VM will be migrated, the source host may be the host from which the VM is migrating. In some embodiments, the new host is identified by the signal, or the signal/instruction to migrate includes the new host.

At operation 606, VM manager 420 identifies target storage systems. The target storage systems are the systems on which the migrating VM is communicating. This may include having I/O queues establishing, an NQN connection, and/or sending and receiving I/O instructions. In some embodiments, the current target systems are identified from access map 422. In some embodiments, the target storage systems are identified based on the mapped volumes.

At operation 608, VM manager 420 determines if the new host is connected to the target storage system. In some embodiments, the new host is connected if a VM on the new host has I/O queues and/or NQN established on the target storage system. This may be identified from access map 422 and/or omitted queue 424. For example, if VM-411 is connected only to primary storage 440, then omitted queue 424 may contain the blocked connection information from the initial connection (e.g. operation 510).

It if is determined the new host is connected to the target storage system (608:YES), then VM manager 420 proceeds to operation 612. It if is determined the new host is not connected to the target storage system (608:NO), then VM manager 420 proceeds to operation 610.

At operation 610, VM manager 420 establishes a connection between the new host and target storage systems. In some embodiments, the connection is established by NVMe connection manager 421. This may include creating I/O queues, and/or an NQN between the new host and the target storage system. In some embodiments, operation 610 includes unblocking connection requests (e.g., the connection request blocked previously).

At operation 612, VM manager 420 migrates the VM. In some embodiments, operation 612 includes ending the delay (or releasing the pause, etc.) placed in operation 602. In some embodiments, operation 612 include creating a new VM. For example, if the old host failed, the VM may have been lost, however, the data could be stored within host cluster 410.

At operation 614, VM manager 420 determines if there are unnecessary I/O queues established. An unnecessary I/O queue can be an established queue between a host and a storage system when no hosted VM is exchanging data with that storage system. For example, consider VM-411 and VM-412 are being hosted on host A 430, and VM-411 is communicating with primary storage 440 and VM-412 with secondary storage 450. If VM-411 migrated to host B 435, no VM on host A 430 is communicating with primary storage 440. However, the I/O queues and NQN between the two devices may still be established, utilizing resources, and be an unnecessary I/O queue. In some embodiments, unnecessary I/O queues are identified based on access map 422 and/or VM to storage mapper 426. These may show which VMs were mapped to which storage devices.

It if is determined there are unnecessary I/O queues (614:YES), then VM manager 420 proceeds to operation 616. It if is determined there are no unnecessary I/O queues (614:NO), then VM manager 420 returns to operation 602.

At operation 616, VM manager 420 terminates the unnecessary I/O queues. In some embodiments, NVMe connection manager 421 terminates the queue. In response to complete operation 616, VM manager 420 returns to operation 602.

Computer Technology and Computer Readable Media

The one or more embodiments disclosed herein accordingly provide an improvement to computer technology. For example, an improvement to a search engine allows for a more efficient and effective search for information by the user. The ability to access stored information with which the user has interacted with in some manner, and allowing the weighting of the importance of this information to decay over time beneficially improves the operation of the search and benefits the user in that more pertinent results may be presented to the user.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method comprising:
   receiving, from a first virtual machine (VM), a request to establish a set of input/output (I/O) queues in a storage system, wherein the first VM is included in a host cluster, and the first VM is supported by a first host;
   identifying a target storage system needed to complete the request and a second storage system is not needed to complete the request;
   mapping, based on the identifying, a data volume to a target storage system, wherein the target storage system is included in the storage system, the data volume is related to the request;
   sending a first connection request from the first host to the target storage system;
   establishing, in response to the first connection request, a connection between the first host and the target storage system; and
   blocking, in response to the identifying the second storage system is not needed to complete the request, a second connection request, wherein the second connection request is directed to the second storage system, the second storage system being included in the storage system.

2. The method of claim 1, further comprising:
   storing omitted queue data, wherein omitted queue data relates to the second connection request, and omitted queue data is based on the first host having no data volumes mapped to the second storage system.

3. The method of claim 1, further comprising:
   receiving an instruction to migrate the first VM from the first host to a second host;
   determining the second host is not in communication with the target storage system;
   unblocking the second connection request;
   establishing a second connection between the second host and the target storage system; and
   migrating the first VM to the second host.

4. The method of claim 3, further comprising:
   identifying, on the first host, an unnecessary I/O queue is established on the target storage system; and
   terminating, based on the identifying, the connection between the first host and the target storage system.

5. The method of claim 4, wherein identifying the unnecessary queue further comprises:
   identifying a set of VM's being hosted on the first host, wherein the set of VM's does not include the first VM;
   determining no VM in the set of VM's is in communication with the target storage system.

6. The method of claim 1, further comprising:
receiving an instruction to migrate a second VM from the first host to a second host;
determining the second host is not in communication with the target storage system;
establishing a second connection between the second host and the target storage system;
migrating the second VM to the second host;
identifying, on the first host, an unnecessary queue is established on the target storage system; and
terminating the connection between the first host and the target storage system.

7. The method of claim 6, wherein the instruction to migrate is received as an asynchronous event request.

8. The method of claim 1, wherein the target storage system and the second storage system use a non-volatile memory express (NVMe) protocol.

9. The method of claim 1, further comprising:
blocking a third connection request, wherein the third connection request is from a second host directed to the target storage system, wherein the second host supports a second VM, and the second VM is included in the host cluster.

10. The method of claim 1, wherein the first connection request is generated by a VM manager, and the first connection requests includes an instruction to block the second connection request.

11. A system comprising:
a processor; and
a computer-readable storage medium communicatively coupled to the processor and storing program instructions which, when executed by the processor, are configured to cause the processor to:
receive, from a first virtual machine (VM), a request to establish a set of input/output (I/O) queues in a storage system, wherein the first VM is included in a host cluster, and the first VM is supported by a first host;
identify a target storage system needed to complete the request and a second storage system is not needed to complete the request;
map, based on the identifying, a data volume to a target storage system, wherein the target storage system is included in the storage system, and the data volume is related to the request;
send first connection request from the first host to the target storage system;
establish, in response to the first connection request, a connection between the first host and the target storage system; and
block, in response to the identifying the second storage system is not needed to complete the request, a second connection request, wherein the second connection request is directed to the second storage system, the second storage system being included in the storage system.

12. The system of claim 11, wherein the program instructions are further configured to cause the processor to:
store omitted queue data, wherein omitted queue data relates to the second connection request, and omitted queue data is based on the first host having no data volumes mapped to the second storage system.

13. The system of claim 11, wherein the program instructions are further configured to cause the processor to:
receive an instruction to migrate the first VM from the first host to a second host;
determine the second host is not in communication with the target storage system;
unblock the second connection request;
establish a second connection between the second host and the target storage system; and
migrate the first VM to the second host.

14. The system of claim 13, wherein the program instructions are further configured to cause the processor to:
identify, on the first host, an unnecessary queue is established on the target storage system; and
terminate, based on the identification of the unnecessary queue, the connection between the first host and the target storage system.

15. The system of claim 14, wherein the identification of the unnecessary queue is further comprises:
identify a set of VM's being hosted on the first host, wherein the set of VM's does not include the first VM;
determine no VM in the set of VM's is in communication with the target storage system.

16. A computer program product, the computer program product comprising a computer readable storage medium having program instructions embodied therewith, the program instructions executable by a processing unit to cause the processing unit to:
receive, from a first virtual machine (VM), a request to establish a set of input/output (I/O) queues in a storage system, wherein the first VM is included in a host cluster, and the first VM is supported by a first host;
identify a target storage system needed to complete the request and a second storage system is not needed to complete the request;
map, based on the identifying, a data volume to a target storage system, wherein the target storage system is included in the storage system, and the data volume is related to the request;
send a first connection request from the first host to the target storage system;
establish, in response to the first connection request, a connection between the first host and the target storage system; and
block, in response to the identifying the second storage system is not needed to complete the request, a second connection request, wherein the second connection request is directed to the second storage system, the second storage system being included in the storage system.

17. The computer program product of claim 16, wherein the program instructions are further configured to cause the processing unit to:
store omitted queue data, wherein omitted queue data relates to the second connection request, and omitted queue data is based on the first host having no data volumes mapped to the second storage system.

18. The computer program product of claim 16, wherein the program instructions are further configured to cause the processing unit to:
receive an instruction to migrate the first VM from the first host to a second host;
determine the second host is not in communication with the target storage system;
unblock the second connection request;
establish a second connection between the second host and the target storage system; and
migrate the first VM to the second host.

19. The computer program product of claim 18, wherein the program instructions are further configured to cause the processing unit to:

identify, on the first host, an unnecessary queue is established on the target storage system; and terminate, based on the identification of the unnecessary queue, the connection between the first host and the target storage system.

20. The computer program product of claim 19, wherein the identification of the unnecessary queue is further comprises:

identify a set of VM's being hosted on the first host, where the set of VM's does not include the first VM; and determine that no VM in the set of VMs is in communication with the target storage system.

* * * * *